Patented Nov. 17, 1942

2,302,403

UNITED STATES PATENT OFFICE 2,302,403

MANUFACTURE OF RESINS FROM NAPHTHALENE DERIVATIVES

John L. Tetley, Wyandotte, Mich., assignor to Sharples Chemicals Inc., a corporation of Delaware No Drawing. Application November 28, 1939, Serial No. 306,499

8 Claims. (Cl. 260—67)

The present invention pertains to the production of resins which may be used in the varnish industry, and in other connections where an oil soluble resin is desired. It pertains particularly to the condensation of polynuclear hydrocarbon derivatives with methylene-containing bodies to produce resins. It is well known that polynuclear hydrocarbons such as naphthalene, anthracene, phenanthrene and by-phenyl may be condensed with formaldehyde and its equivalents, such as acetaldehyde, paraldehyde and trioxymethylene, to produce hard resins. The resins so produced are soluble in hydrocarbon oils, such as benzene, but they are insoluble in oils of the type of the ordinary drying oils employed in the production of varnishes. An object of the present invention has been to produce hard resins which are soluble in the ordinary drying oils as well as hydrocarbon oils, and which are excellently adapted for use in varnishes.

The present invention rests upon the discovery that when nuclear alkylated naphthalene derivatives, containing alkyl side chains having a total of three or more carbon atoms in the alkyl substituent or substituents, are condensed with formaldehyde or its equivalents under the conditions heretofore employed in producing the conventional naphthalene-formaldehyde resins, resins having the desired property of solubility in varnish oils are obtained.

The condensation reaction between the alkyl substituted naphthalene and the aldehyde may be accomplished with the aid of condensing agents heretofore employed in the production of resins from naphthalene and formaldehyde; e. g., sulfuric acid, zinc chloride, aluminum chloride, or ferric chloride. In cases in which aqueous solutions of formaldehyde are used to promote the condensation reaction, the preferred condensing agent is sulfuric acid, since resins produced by condensation of the naphthalene derivatives with aqueous solutions of formaldehyde are less satisfactory when the other condensing agents referred to above are used, than when sulfuric acid is used to promote the condensation.

Resins produced from alkylated naphthalenes containing three or more carbon atoms in a branched chain connected to a carbon atom of the naphthalene nucleus are of particularly high quality, whether the naphthalene nucleus be substituted by a single such branched chain alkyl substituent, or by two or more substituents.

The invention includes within its broad scope resins produced by condensing naphthalene derivatives containing a cyclo-aliphatic substituent with the aldehydes, as well as resins formed when the substituent is an open chain radical.

Example I

A mixture was made, containing the following constituents:

| | Grams |
|---|---|
| Naphthalene | 128 |
| Acetic anhydride | 180 |
| Zinc chloride | 5 |
| Acetyl chloride | 5 |
| Trioxymethylene | 30 |

This mixture was refluxed for approximately three hours. The material was then dissolved in benzene and washed with water several times. It was then washed with a caustic soda solution and hardened by heating on a hot plate, while stirring the material.

The resulting resin was of light amber color, was very hard, but was insoluble in drying oils.

Example II

A mixture was made, containing the following constituents:

| | Grams |
|---|---|
| Methyl naphthalene | 282 |
| Formaldehyde (37% solution) | 240 |
| Concentrated sulfuric acid | 240 |

This mixture was produced by adding the sulfuric acid rapidly to the mixture of methyl naphthalene and formaldehyde, while vigorously agitating the mixture and cooling it. After the addition of the sulfuric acid was completed, the mixture was heated to a temperature between 80 and 90° C. for three additional hours. Benzene was now added to the resinous mass, and the material was refluxed in an oil bath for approximately twenty-four hours in order to extract all of the resin.

The resulting mixture was washed with an alcoholic solution of potassium hydroxide. It was then washed with water and hardened by evaporation of the benzene as in Example I.

The resulting resin was of light brown color, was very hard, but was insoluble in drying oils.

Example III

A mixture was made, containing the following constituents:

| | Grams |
|---|---|
| Iso-propyl naphthalene | 170 |
| Formaldehyde (37%) | 120 |
| Concentrated sulfuric acid | 120 |

The sulfuric acid was added gradually over a period of from 10 to 15 minutes with very vigorous agitation. After the addition of the sulfuric acid, the mass was heated to a temperature, between 90 and 100° C. over a water bath for three hours, while agitating the mixture.

The resulting material was dissolved in benzene and treated with kieselguhr and filtered. It was washed with ammonium hydroxide and was thereafter washed several times with water. The resin was hardened by evaporation of the benzene, as in Example I.

The resulting resin was of light amber color, was very hard, and was soluble in drying oils.

*Example IV*

A mixture was made, containing the following constituents:

| | Grams |
|---|---|
| Di-iso-propyl-naphthalene | 212 |
| Formaldehyde (37%) | 120 |
| Concentrated sulfuric acid | 120 |

The sulfuric acid was added over a period of 10 to 15 minutes through a dropping funnel with vigorous agitation and cooling. After the addition of the sulfuric acid, the mass was heated to a temperature of 60 to 70° C., over a water bath for three hours. The resulting resin was extracted and purified as described in Example III, and was found to be an amber colored resin, very hard and soluble in drying oils.

*Example V*

A mixture was made, containing the following constituents:

| | Grams |
|---|---|
| Tertiary butyl naphthalene | 184 |
| Formaldehyde (37%) | 120 |
| Concentrated sulfuric acid | 120 |

The resin was produced from this mixture in the same manner described in Example III, and was found to be of light clear amber color, very hard and soluble in drying oils.

*Example VI*

A mixture was made, containing the following constituents:

| | Grams |
|---|---|
| Di-tertiary butyl naphtalene | 241 |
| Formaldehyde (37%) | 120 |
| Concentrated sulfuric acid | 120 |

The sulfuric acid was added over a period of from 10 to 15 minutes through a dropping funnel with vigorous agitation and cooling. The mixture was heated to a temperature between 90 and 100° C. for six hours, after the addition of sulfuric acid.

The resin was extracted and purified in the same manner described in Example III and was found to be a brown colored resin, hard and soluble in drying oils.

*Example VII*

A mixture was made, containing the following constituents:

| | Grams |
|---|---|
| Mono-amyl naphthalene (principally secondary amyl) | 800 |
| Formaldehyde (37%) | 480 |
| Concentrated sulfuric acid | 480 |

The sulfuric acid was added over a period of 30 minutes through a dropping funnel with cooling and vigorous agitation. The mixture was then heated to a temperature of 60° C. for sixteen hours, and thereafter heated to a temperature of between 80 and 90° C. for five hours.

Heptane was added to the resulting material and the mixture was washed with a 10% sodium hydroxide solution, and thereafter washed several times with water. It was treated with kieselguhr, filtered and hardened as in the preceding examples.

The resulting resin was hard, light brown in color, and soluble in drying oils.

*Example VIII*

A mixture was made, containing the following constituents:

| | |
|---|---|
| Mono-amyl naphthalene | grams 800 |
| Formaldehyde (37%) | do 480 |
| Water | cubic centimeters 100 |
| Concentrated sulfuric acid | grams 480 |

The sulfuric acid was added over a period of 10 to 15 minutes with cooling and very vigorous agitation. After the addition of the sulfuric acid, the mixture was heated to a temperature of 50° C. for 1½ hours, and then heated to a temperature between 80 and 90° C. for five hours. Heptane was added, and the material was treated with kieselguhr, filtered, neutralized and hardened, as in the preceding example.

The resulting resin was hard, of light brown color, and was soluble in drying oils.

*Example IX*

A quantity of technical monoamyl naphthalene was purified by three successive 20% (by volume) washes with 93% $H_2SO_4$. The oil layer was treated with 5% of its weight of a clay which had been activated by treatment with sulfuric acid, filtered, washed with dilute NaOH solution and vacuum distilled. The product was almost water white. 792 grams (4 mols) of this purified monoamyl naphthalene was placed in a flask with 160 grams (5.3 mols) trioxymethylene. A solution of 100 grams anhydrous zinc chloride in 1000 cc. of glacial acetic acid was now added to the mixture and the mass gently refluxed for eight hours. At the end of this time it was poured into 3000 cc. water and extracted with 1000 cc. of a heptane cut. This solution was treated with a small amount of active clay, filtered, washed with dilute NaOH, the solvent evaporated off and the product hardened by heating with stirring. A good yield of light amber resin of medium hardness was obtained. It exhibited excellent solubility in drying oils.

Modifications will be obvious to those skilled in the art, and I do not therefore wish to be limited except by the scope of the sub-joined claims. In these claims, when reference is made to formaldehyde, it is to be understood that equivalent reagents, such as those described above, are intended to be included.

I claim:

1. An oil soluble synthetic resinous product formed by condensing formaldehyde with a naphthalene bearing not more than two alkyl substituents having three to five carbon atoms in the approximate molecular proportions of one and a half mols of the former per mol of the latter.

2. An oil soluble synthetic resinous product formed by condensing formaldehyde with a naphthalene bearing a tertiary butyl substituent in the approximate molecular proportions of one and a half mols of the former per mol of the latter.

3. An oil soluble synthetic resinous product formed by condensing formaldehyde with a naphthalene bearing a secondary propyl substituent in the approximate molecular proportions of one and a half mols of the former per mol of the latter.

4. An oil soluble synthetic resinous product formed by condensing formaldehyde with a naphthalene bearing a five carbon atom chain alkyl substituent in the approximate molecular proportions of one and a half mols of the former per mol of the latter.

5. Process for preparing oil-soluble resinous products that comprises condensing formaldehyde with a naphthalene bearing not more than two alkyl substituents having three to five carbon atoms with heat and agitation of the mixture in the presence of a catalyst consisting essentially of sulfuric acid, the formaldehyde and the naphthalene being present in the initial reaction mixture in the approximate proportion of one and a half mols of the former per mol of the latter, substantially removing the acid after the desired degree of condensation occurs, and heating to form a hard solidified product.

6. Process for preparing oil-soluble resinous products that comprises condensing formaldehyde with a naphthalene bearing a tertiary butyl substituent with heat and agitation of the mixture in the presence of a catalyst consisting essentially of sulfuric acid, the formaldehyde and the naphthalene being present in the initial reaction mixture in the approximate proportion of one and a half mols of the former per mol of the latter, substantially removing the acid after the desired degree of condensation occurs, and heating to form a hard solidified product.

7. Process for preparing oil-soluble resinous products that comprises condensing formaldehyde with a naphthalene bearing a secondary propyl substituent with heat and agitation of the mixture in the presence of a catalyst consisting essentially of sulfuric acid, the formaldehyde and the naphthalene being present in the initial reaction mixture in the approximate proportion of one and a half mols of the former per mol of the latter, substantially removing the acid after the desired degree of condensation occurs, and heating to form a hard solidified product.

8. Process for preparing oil-soluble resinous products that comprises condensing formaldehyde with a naphthalene bearing a five carbon atom chain alkyl substituent with heat and agitation of the mixture in the presence of a catalyst consisting essentially of sulfuric acid, the formaldehyde and the naphthalene being present in the initial reaction mixture in the approximate proportion of one and a half mols of the former per mol of the latter, substantially removing the acid after the desired degree of condensation occurs, and heating to form a hard solidified product.

JOHN L. TETLEY.